Sept. 22, 1959 D. M. ADAMS ET AL 2,905,286
GRILLE ASSEMBLY
Filed Oct. 7, 1953 2 Sheets-Sheet 2

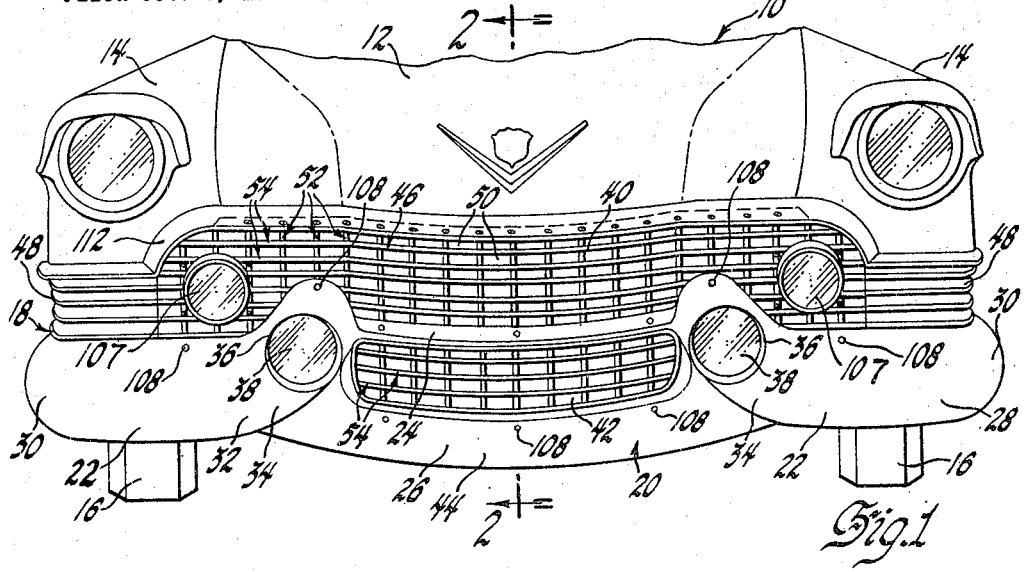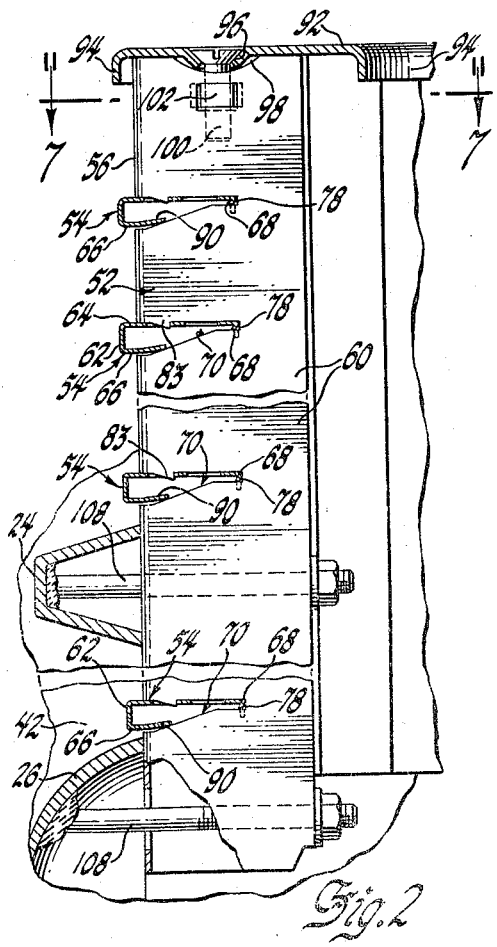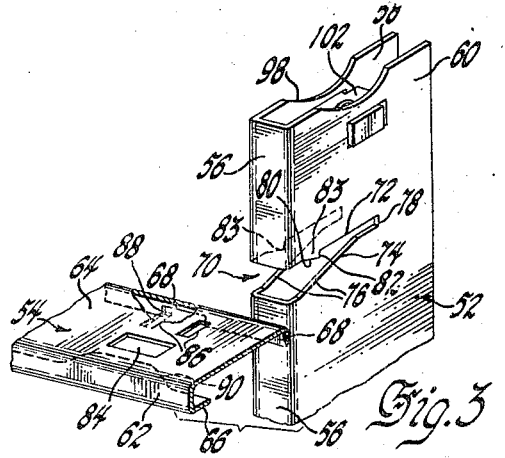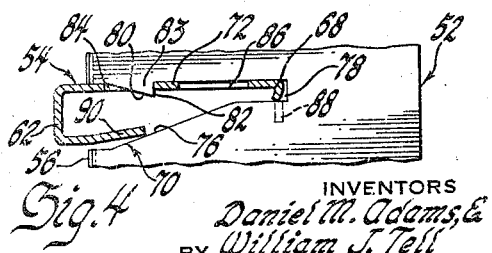

INVENTORS
Daniel M. Adams &
BY William J. Tell
ATTORNEY

United States Patent Office 2,905,286
Patented Sept. 22, 1959

2,905,286

GRILLE ASSEMBLY

Daniel M. Adams and William J. Tell, Birmingham, Mich., assignors to General Motors Corporation, Detroit, Mich., a corporation of Delaware Application October 7, 1953, Serial No. 384,622

6 Claims. (Cl. 189—82)

The present invention relates to bumpers and more particularly to a combination radiator grille and bumper assembly for use on automobiles.

When decreasing the height of an automobile and particularly the engine hood, the air inlet for the engine cooling system must of necessity be an elongated, horizontal opening that extends across the front of the vehicle. When a bumper is disposed horizontally across the end of a car having such an air inlet, it frequently interferes with the flow of air therethrough.

It is proposed to provide a horizontal bumper structure which may be disposed at approximately the same height as the air inlet without interfering with the flow of air into the cooling system. This is to be accomplished by employing a bumper having a pair of horizontally disposed end members and a pair of horizontal center members which are fastened between the end members to form an opening that registers with at least a portion of the inlet. The lower center member is preferably lower than the end members so that the opening may be at substantially the same height as the end members.

The radiator grilles on the front of automobiles are frequently damaged as a result of minor collisions. When the grilles presently employed are so damaged, it is usually necessary to replace the entire grille assembly.

Accordingly it is proposed to employ a grille assembly which is fabricated from a plurality of vertical and horizontal slats formed from inexpensive sheet metal stampings. The slats may be secured together by means of a unique snap fastening that is formed integral with the slats. Thus if a portion of the grille is damaged, the defective slats may be easily replaced thus reducing the necessity of replacing the entire grille structure.

It is also proposed to mount the grille structure so that it is carried by the resiliently mounted bumper structure for movement therewith. Thus, if an impact forces the bumper structure towards the car, the grille structure will move with the bumper and thereby minimize damage to the grille.

In the drawings:

Fig. 1 is a front elevational view of a front end of an automotive vehicle having a combined grille and bumper structure employing the present invention.

Figure 2 is a vertical section of the grille structure taken substantially along the plane of line 2—2 in Fig. 1.

Fig. 3 is an exploded perspective view showing the locking structure for the slats.

Fig. 4 is an enlarged view of a portion of Fig. 2.

Figure 5:
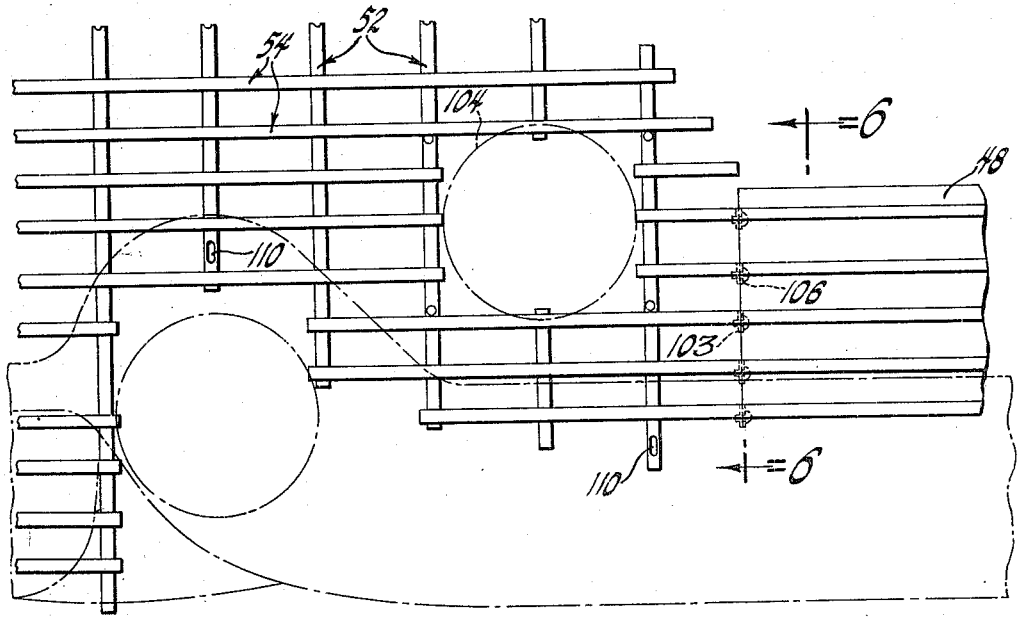
Fig. 5 is an enlarged front view of an end portion of the grille and bumper structure.
Figure 6:
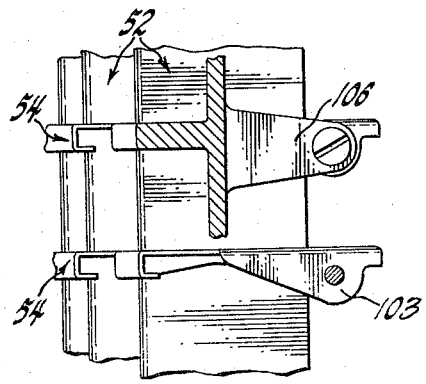
Fig. 6 is an enlarged fragmentary view in section taken substantially along the plane of line 6—6 in Fig. 5, showing representative cross connections between horizontal and vertical slats of the grille.
Figure 7:
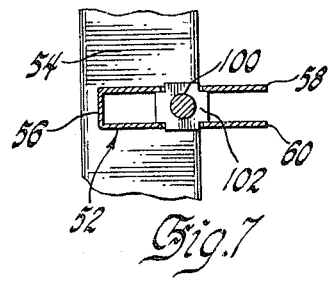
Fig. 7 is a plan view of a portion of the grille structure.

Referring to the drawings in more detail, the front end of vehicle 10 has a hood 12 for covering the engine. In addition fenders 14 are disposed at each side of the hood 12 for covering the front wheels 16. In order to cool the engine, an air inlet may be formed below the hood 12 and between the fenders 14 so as to allow cooling air to pass therethrough and across the radiator and engine. In order to conceal and protect the air inlet, a combined bumper and grille structure 18 may be provided on the front of the vehicle 10 so as to register with the air inlet.

The bumper 20 may comprise a pair of end members 22 and a pair of center members 24 and 26. Each of the end members 22 are preferably provided with a center portion 26 that forms a primary impact surface 28. If it is desired to provide additional protection for the sides of the fenders 14, the outer ends 30 of each of the end members 22 may be formed at substantially right angles to the center portion 26. Thus when the end members 22 are secured to the vehicle 10, the outer ends 30 will wrap around the sides of the fenders 14. The inner ends 32 of the bumper members 22 which are preferably spaced from each other are formed upwardly and inwardly towards each other so as to provide inclined sections 34. These inclined sections 34 improve the usefulness of the bumper by increasing its effective width to the point where it may strike objects of varying heights. The upper end of each of the inclined sections 34 has a housing 36 formed therein to receive a grille guard 38. The guards 38 preferably project outwardly from the end members 22 and prevent an obstruction from climbing over the bumper and damaging the grille 40.

The center members comprise an upper member 24 and a lower member 26 which are disposed between the inner ends of the bumper members 22 in parallel spaced relation. The upper member 24 has the opposite ends thereof secured to the sides of the housings 36 by any suitable means such as welding. This member 24 is preferably narrow so as not to materially interfere with the flow of air through the grille 40. The lower member 26 has the opposite ends thereof secured to the lower portion of the inclined sections 34. Thus an elongated opening 42 is formed between the center members 24 and 26 to register with the air inlet. It is highly desirable that the ends of the center members 24 and 26 be secured to the end members 22 by welding so as to form an integral unitary structure that may be resiliently secured to the chassis. The lower member 26 is preferably of substantially the same thickness as the end members 22 so as to form an impact surface 44 lying in substantially the same frontal plane as the impact surfaces 28 on the end members 22. The lower member 26 may also be slightly curved in a downward direction so that it is disposed below the end members 22. Thus the opening 42 will be in substantial alignment with the end members 22.

The grille 40 which is preferably secured to the back of the bumper 20 to move therewith includes a center section 46 and a pair of end wings 48. The center section 46 which has a plurality of apertures 50 positioned to register with the inlet may be fabricated from a plurality of vertical slats 52 and a plurality of horizontal slats 54; i.e., the slats may be orthogonal to each other. In the present instance the vertical slats 52 are formed from sheet metal which is bent into a substantially U-shape. Each of the vertical slats 52 thus has a base portion 56 which is visible from the front of the vehicle 10 and a pair of rearwardly extending sides 58 and 60 that project from the opposite edges of the base portion 56. The horizontal slats 54 may be also fabricated from sheet metal. In the present instance these slats 54 have a base portion 62 with a long wall 64 and a short wall 66 that project from the opposite edges thereof.

The back edge of the long wall 64 may have a flange 68 thereon.

In order to facilitate securing the slats 52 and 54 together, fastening means may be provided integral with the slats. In the present instance this means includes a V-shaped notch 70 extending into vertical slat 52 from its base portion 56. The notch 70 may include an opening through the base portion that extends into the sides 58 and 60 so as to have converging edges 72 and 74. The upper edges 72 in the sides 58 and 60 are preferably normal to the base portion and the lower edges 74 preferably have inclined portions 76 that converge toward the upper edges 72 so as to provide a narrow root 78 at the inner end of the notch 70. A detent may be provided on some or all of the notches. In the present instance a detent 83 is provided on each of the upper edges and includes a rearwardly sloping portion 80 and a vertical end 82. The horizontal slats 54 are adapted to fit into the notches 70. A plurality of apertures 84 may be provided in the long wall 64 to cooperate with the detents for locking the slats 52 and 54 together. In the present instance these apertures 84 extend longitudinally of the slat 54 and are of sufficient length to accommodate both of the detents 83. The back edge of the aperture is positioned to engage the back edge 82 of the detents 83 when the slats are assembled in the correct position. In order to facilitate inserting the horizontal slat 54 into the notch 70 a pair of openings 86 may extend transverse of the long wall 64 in alignment with the detents 83. When the slat 54 is inserted into the notch 70, the detents 83 will ride through the openings 86 rather than on the surface of the long wall 64. Shoulder means 88 may be provided on the flange 68 so as to guide the slats during assembly and to prevent relative twisting of the slats when assembled.

The short wall 66 may have a resilient portion such as a lip 90 disposed below the aperture 84 and positioned to engage the inclined portions 76. Thus when the slats are assembled as shown in Fig. 4, this lip 90 will be compressed upwardly and resiliently urge the horizontal slat 54 against the upper edge 72 of the notch 70. Thus this spring action will insure the detent 83 and aperture 84 being in locking engagement so that the grille 40 when assembled will be a rigid self-contained structure.

The upper ends of the vertical slats 52 are secured together by any suitable means such as an elongated strap 92. In the present instance this strap 92 has a pair of downwardly turned flanges 94 on each edge which are positioned to straddle the upper ends of the vertical slats 52. A plurality of counter sunk holes 96 may be provided to register with the recess 98 in the upper end of the vertical slat 52. Thus the strap 92 may be secured in position by the bolts 100 that extend downwardly into the nut 102 between the sides 58 and 60 of the vertical slat 52.

The ends of the horizontal slats 54 are provided with flanges 103 that are adapted to receive the flanges 106 on the wing members 48. The wing members 48 which may be imperforate are intended to be primarily decorative. When the wing members are bolted to the horizontal slats, they will extend around the sides of the fenders 14 and the grille structure 40 will be a single unit.

If desired openings 104 may be provided in the grille 40 for mounting accessories such as parking lights 107.

To assemble the grille and bumper structure 18 the vertical slats 52 may be held in their proper aligned position by a jig or other suitable means. The horizontal slats 54 are then positioned in the notches 70 so that the apertures 84 and lips 90 are positioned to register with the notches 70. The horizontal slats 54 are then forced inwardly into the notch 70 until the detents 83 are positioned in the longitudinal apertures 84. If the detents 83 can pass through the transverse openings 86 without necessitating the compression of the spring portion 90, this step will be made easier. When the horizontal slats 54 are properly positioned in the notches 70, the spring portion 90 will be compressed to insure the detents 83 always engaging the edges of the longitudinal apertures 84 so as to lock the slats 52 and 54 together. The shoulder means 88 formed by the downwardly turned flange 68 will prevent any relative twisting movement of the vertical and horizontal slats. After all of the vertical and horizontal slats are so assembled the strap 92 may be placed on the top ends of the vertical slats and fastened thereto by tightening of the screws. Following this the wing portions 48 and accessories may be bolted onto the grille structure 40.

After the grille structure is fabricated into an integral subassembly, it may be bolted onto the back of the bumper assembly 20 by bolts 108 welded to the various portions of the bumper structure. The bolts 108 may be positioned to extend through the elongated openings 110 in the vertical slats 52. The combined grille and bumper assembly 18 may then be secured to the chassis of the vehicle 10 by any suitable resilient means. If desired a decorative trim member 112 may be mounted on the automobile body so as to extend outwardly over the edges of the grille structure 40. It will thus be apparent that the grille and bumper comprise an integral assembly and due to the resilient mounting of the bumper both will move together as a unit relative to the body.

While the foregoing description and figures have been confined to one embodiment, it will be apparent to those skilled in the art that numerous modifications may be made without departing from the spirit thereof. Accordingly, it is to be understood that the foregoing is to be considered as illustrative only and in no way restrictive, reference being had to the appended claims to determine the scope of the invention.

What is claimed is:

1. A grille like structure comprising a pair of slats, one in crossed relation to the other and having a notch defined by a pair of spaced edges converging toward the interior of said one slat, a detent on one of said edges projecting toward the other of said edges, the other of said slats extending into said notch, said other slat having an aperture therein receiving said detent, and a spring portion on said other slat engaging said other edge and biasing said aperture and said detent into locking engagement.

2. A grille like structure comprising a first slat having a notch defined by a pair of edges converging toward the interior of said slat, a detent on one of said edges projecting toward the other of said edges, a second slat disposed in crossed relation to said first slat and extending into said notch, said second slat having an aperture therein for receiving said detent, a spring portion on said second slat engaging said other edge and biasing said aperture and said detent into locking engagement, and shoulder means on one of said slats engaging the other slat and preventing relative movement thereof.

3. A grille like structure comprising a first set of slats each having notches on one side thereof defined by a pair of edges converging toward the interior of said slats, the notches in each slat being in respective alignment with the corresponding notches in the others of said slats, a detent on one of said edges of each notch projecting toward the other of said edges, a second set of slats engaging said notches and disposed at right angles to said first set of slats, each of said second slats having apertures receiving said detents, and a spring portion on each of said second slots biasing its said aperture and associated detent into locking engagement.

4. A grille like structure comprising a first set of slats having notches on the sides thereof, said notches in each slat being in respective alignment with the corresponding notches in the others of said slats and each being defined by a first edge substantially normal to one side of said slat and a second edge converging from said first edge toward the interior of the slat, a detent on said first edge projecting toward said second edge, a second set of slats engaging said notches and disposed at substantially right angles to said first set of slats, each of said second slats having an aperture receiving its associated detent, and a spring portion on each of said second slats engaging said second edge and biasing said second slat against said first edge for retaining said apertures and detents in locking engagement.

5. A grille structure comprising a set of U-shaped slats formed by folding a piece of sheet metal, notches formed on the folded side of each of said slats, said notches being in respective alignment with the corresponding notches in the others of said slats and each being defined by a pair of edges converging toward the interior of the slat, a detent on the first of said edges projecting toward the other of said edges, a set of J-shaped slats disposed in crossed relation to said U-shaped slats and engaging said notches, each of said J-shaped slats having an aperture receiving the detent associated with its notch, and a resilient lip engaging the second of said edges to bias said aperture and detent in locking engagement.

6. A grille like structure comprising a vertical slat having a vertical base portion and a pair of sides projecting rearwardly from the opposite edges of said base portion in parallel spaced relation, said slat having a notch formed in said base portion, said notch being defined by a horizontal edge and an edge inclined upwardly from the base portion toward the interior of the slat, a detent on each of said horizontal edges, a horizontal slat engaging said notch, said horizontal slat having a base portion with a long wall and a short wall projecting from the opposite edges thereof in spaced parallel relation, said long wall having an opening receiving said detent and said short wall having a portion thereof positioned to resiliently engage said inclined edge and bias said detent and said opening into locking engagement.

References Cited in the file of this patent

UNITED STATES PATENTS

| | | |
|---|---|---|
| D. 152,010 | Macauley | Dec. 7, 1948 |
| 380,069 | Wilson et al. | Mar. 27, 1888 |
| 1,426,736 | Hess | Aug. 22, 1922 |
| 1,631,691 | Nagin | June 7, 1927 |
| 1,650,635 | Lyon | Nov. 29, 1927 |
| 1,669,236 | Fick | May 8, 1928 |
| 1,734,660 | Williams et al. | Nov. 5, 1929 |
| 1,951,653 | Green | Mar. 20, 1934 |
| 1,961,852 | Green | June 5, 1934 |
| 2,023,081 | Jandus | Dec. 3, 1935 |
| 2,193,229 | Exner | Mar. 12, 1940 |
| 2,260,578 | Murray | Oct. 28, 1941 |
| 2,329,874 | Cadwallader et al. | Sept. 21, 1943 |
| 2,396,735 | Leigh | Mar. 19, 1946 |
| 2,437,186 | Collins | Mar. 2, 1948 |
| 2,578,068 | Johnson | Dec. 11, 1951 |
| 2,621,955 | Dykstra | Dec. 16, 1952 |
| 2,667,374 | Signori | Jan. 26, 1954 |

FOREIGN PATENTS

| | | |
|---|---|---|
| 946 | Great Britain | Nov. 17, 1904 |
| 28,939 | Netherlands | Feb. 15, 1933 |